US 9,027,051 B2

United States Patent
Rajaopadhye

(10) Patent No.: US 9,027,051 B2
(45) Date of Patent: May 5, 2015

(54) DETERMINING WHETHER AN ADVERTISEMENT AIRED IN ACCORDANCE WITH PREDEFINED AIRING SPECIFICATIONS

(75) Inventor: Nagesh Rajaopadhye, Pune (IN)

(73) Assignee: Accenture Global Services Limited, Dublin (IE)

( * ) Notice: Subject to any disclaimer, the term of this patent is extended or adjusted under 35 U.S.C. 154(b) by 253 days.

(21) Appl. No.: 13/090,760

(22) Filed: Apr. 20, 2011

(65) Prior Publication Data

US 2012/0173342 A1 Jul. 5, 2012

(30) Foreign Application Priority Data

Dec. 31, 2010 (IN) .......................... 4043/CHE/2010

(51) Int. Cl.
| | | |
|---|---|---|
| H04N 7/10 | (2006.01) | |
| H04N 7/025 | (2006.01) | |
| H04N 21/845 | (2011.01) | |
| G06Q 30/02 | (2012.01) | |
| H04N 21/44 | (2011.01) | |
| H04N 21/81 | (2011.01) | |
| H04N 21/8358 | (2011.01) | |
| H04H 20/14 | (2008.01) | |
| H04H 60/37 | (2008.01) | |
| H04H 60/39 | (2008.01) | |
| H04H 60/59 | (2008.01) | |

(52) U.S. Cl.
CPC ....... *H04N 21/8456* (2013.01); *G06Q 30/0272* (2013.01); *H04N 21/44008* (2013.01); *H04N 21/812* (2013.01); *H04N 21/8358* (2013.01); *H04H 20/14* (2013.01); *H04H 60/375* (2013.01); *H04H 60/39* (2013.01); *H04H 60/59* (2013.01)

(58) Field of Classification Search
None
See application file for complete search history.

(56) References Cited

U.S. PATENT DOCUMENTS

| | | |
|---|---|---|
| 5,504,518 A | 4/1996 | Ellis et al. |
| 6,708,335 B1 | 3/2004 | Ozer et al. |

(Continued)

FOREIGN PATENT DOCUMENTS

GB 2451518 A 2/2009

OTHER PUBLICATIONS

"Austomatic Commercial Monitoring for TV Broadcasting Using Audio Fingerprinting", http://mmp.kaist.ac.kr/paperdata/%5BAES29th%5DAutomatic_Commercial_Monitoring_For_TV_Broadcasting_Using_Audio_Fingerprinting.;df.

(Continued)

*Primary Examiner* — Mark D Featherstone
(74) *Attorney, Agent, or Firm* — Harrity & Harrity, LLP

(57) ABSTRACT

A method and computing devices are provided for determining whether an advertisement aired in accordance with predefined airing specifications. A plurality of advertisement identification markers may be inserted into an advertisement by a first computing device. The plurality of advertisement identification markers may be inserted between the start and end of the advertisement. A second computing device may receive a broadcast stream including the advertisement having the plurality of advertisement identification markers. Airing parameters of the advertisement may be determined by the second computing device based on the advertisement identification markers. The airing parameters of the advertisement may be compared with predefined airing specifications corresponding to the advertisement. Auditing data may be generated that describes whether or not the advertisement aired in accordance with the predefined airing specifications.

34 Claims, 4 Drawing Sheets

(56) References Cited

U.S. PATENT DOCUMENTS

| | | |
|---|---|---|
| 7,269,330 B1 | 9/2007 | Iggulden |
| 2002/0059633 A1* | 5/2002 | Harkness et al. ............. 725/108 |
| 2002/0131511 A1 | 9/2002 | Zemoni |
| 2002/0162118 A1* | 10/2002 | Levy et al. ................... 725/110 |
| 2004/0261100 A1 | 12/2004 | Huber |
| 2006/0031892 A1 | 2/2006 | Cohen |
| 2007/0016918 A1 | 1/2007 | Alcorn et al. |
| 2007/0157224 A1 | 7/2007 | Pouliot et al. |
| 2007/0261073 A1* | 11/2007 | Blumenschein et al. ....... 725/19 |
| 2007/0265918 A1 | 11/2007 | McMahon et al. |
| 2009/0077579 A1 | 3/2009 | Li |
| 2009/0133054 A1 | 5/2009 | Boggie |
| 2009/0204541 A1* | 8/2009 | Zhuk et al. ...................... 705/50 |
| 2009/0320060 A1 | 12/2009 | Barrett |
| 2010/0162288 A1 | 6/2010 | Huffman |
| 2010/0313217 A1 | 12/2010 | Bassali |
| 2011/0145068 A1* | 6/2011 | King et al. ................. 705/14.55 |

OTHER PUBLICATIONS

"A Visual Feature based Video Identifying System for the TV Commercial's Monitoring", http://ieeexplore.ieee.org/application/mdl/mdlconfirmation.jps?arnumber+01625708.

"Digital Steganography", http://en.wikipedia.org/w/index.php?title+Steganography&printable=yes Oct. 6, 2010.

"Vertical Blanking Interval (VBI), Teletext & MINITEL", http://www.itvdictionary.com/teletext.html.

European Search Report issued Apr. 13, 2012 in EP11010172.

European Communication corresponding to EP 11 010 172.2, mailed Jan. 27, 2014, 5 pages.

* cited by examiner

DETERMINING WHETHER AN ADVERTISEMENT AIRED IN ACCORDANCE WITH PREDEFINED AIRING SPECIFICATIONS

FIELD OF THE INVENTION

The instant disclosure relates generally to the detection of markers within broadcast signals and, more specifically, to techniques for determining whether an advertisement aired in accordance with predefined airing specifications.

BACKGROUND OF THE INVENTION

Organizations frequently purchase advertising space in media broadcasts (e.g., television and/or radio broadcasts) from broadcasters (e.g., the television or radio companies broadcasting the media stream). The terms governing the broadcast of a particular advertisement are generally negotiated between the advertiser and the broadcaster prior to the broadcast. Such terms, referred to herein as predefined airing specifications, define the expectations of the advertiser and broadcaster regarding parameters such as: when the advertisement will air, how long the advertisement will air for, what channel/station the advertisement will air on, how frequently the advertisement will air, etc. Because broadcasters typically have the final say regarding when and how particular advertisements are aired, advertisers have employed a variety of conventional techniques to ensure that their advertisements air in accordance with the predefined airing specifications.

One conventional advertisement auditing technique involves hiring personnel to watch a television broadcast or listen to a radio broadcast (or watch/listen to recordings thereof) and measure the parameters that their employer negotiated with the broadcaster. That is, in one conventional technique, advertisers hire people to watch/listen to a broadcast and take measurements regarding, for example, what time the advertisement(s) actually aired, the actual duration of the advertisement(s), what channel/station the advertisement(s) actually aired on, etc. The measured parameters are then compared with the negotiated parameters set forth in the predefined airing specifications to determine whether the broadcaster aired the advertisement(s) in accordance with the expectations of the advertiser. This technique produces a number of undesirable consequences, however. For example, this technique requires the advertiser to pay the wages of the monitoring personnel, introduces human error into the auditing procedure, and can be excessively time-consuming (e.g., when monitoring personnel need to re-watch an advertisement in order to retake a measurement).

Another existing technique seeks to allow advertisers to verify whether their advertisements aired in-line with predefined airing specifications by encoding markers in ancillary channels relative to the programming content itself. For example, this technique involves encoding markers in the vertical blanking interval (VBI) or the overscan region of a television signal carrying the advertisement. The encoded signal is then broadcast to individual viewers' home entertainment systems, where the home entertainment systems detect whether the encoded signal contains a marker in the VBI or overscan region. If so, the home entertainment system may generate viewing behavior information. This viewing behavior information may be sent to a clearinghouse for additional processing to determine, for example, whether an advertisement aired in accordance with an advertiser's expectations.

While this technique reduces the potential for human error, it nonetheless suffers from a number of drawbacks. For example, this technique unnecessarily monopolizes the ancillary channels with advertisement marker data. As such, these channels are no longer available for the transmission of other pertinent data that is typically transmitted in the VBI or overscan region. For example, closed captioning data, test signals, time codes, teletext, CGMS-A copy-protection indicators, and data encoded by the XDS protocol (e.g., the content ratings for V-chip use) are regularly transmitted in the VBI. Using this technique, however, some or all of these pertinent types of data must be excluded from the VBI or overscan region to allow for the inclusion of the advertisement marker. Another drawback associated with this technique is that it places too much reliance on the broadcaster to accurately encode the markers into the ancillary channel stream. That is, the broadcaster controls what data, if any, is inserted into the VBI or overscan region. Because the markers are designed to audit the broadcaster, it is undesirable to give the broadcaster any significant control over the content or placement of the markers.

Other existing techniques seek to provide advertisement broadcast auditing by, for example, generating a "signature" of a particular advertisement based on audio and/or visual attributes that are unique to that advertisement, and then monitoring a broadcast stream to identify instances of the signature. For example, one such technique involves analyzing an advertisement to generate an "audio signature" (e.g., an audio frequency profile) of the advertisement. A broadcast stream is then monitored to detect the occurrence of the advertisement by comparing the audio signature of the target advertisement against the audio frequency profile of the broadcast stream. When the frequency profile of the broadcast stream matches the audio signature of the advertisement, an occurrence of the advertisement is detected. A related technique involves generating a visual signature of an advertisement based on pixel values in a particular area of one or more advertisement image frames. For example, this technique involves generating a visual signature for an advertisement based on $RGB/YC_bC_r/Y'C_bC_r$/etc. pixel values for a given number of pixels in one or more image frames of the advertisement. A broadcast stream may then be monitored to detect instances of the signature, thereby identifying occurrences of the advertisement. However, these signature-type techniques are extremely demanding upon computer resources due to the fact that they require analysis of the entire broadcast stream.

Yet another technique involves placing one or more triggers indicating the presence of an advertisement within the programming content itself (i.e., not in an ancillary channel such as the VBI). For example, a system employing this technique places a trigger at the beginning and/or end of an advertisement. A detection unit then detects the presence of the trigger(s) to verify that the advertisement was in fact aired. This technique suffers from a number of shortcoming as well. For example, when only a single trigger is placed in the stream (e.g., at the beginning of the stream), the detection unit is unable to ascertain whether the entire advertisement was displayed or whether the advertisement was truncated following the trigger. Furthermore, while this technique allows for cursory analysis of an advertisement (e.g., whether an advertisement aired or not), it provides little, if any, detail regarding how the advertisement was aired. That is, this technique allows for broad generalizations regarding the advertisement (e.g., whether it aired at all), but it fails to provide specific information concerning the advertisement such as when particular segments of a single advertisement aired, whether all of the expected frames of the advertisement were successfully broadcast, etc.

It is therefore desirable to provide improved techniques for marking an advertisement for insertion into a broadcast stream, analyzing the broadcast stream containing the marked advertisement in order to glean information about the advertisement that actually aired, and comparing details about the advertisement that actually aired against predefined airing specifications.

SUMMARY OF THE INVENTION

The instant disclosure describes techniques for determining whether an advertisement aired in accordance with predefined airing specifications. To this end, in one example, a plurality of advertisement identification markers are inserted into an advertisement by a first computing device. Specifically, the plurality of advertisement identification markers are inserted between the start and end of the advertisement to provide a marked advertisement. A second computing device receives a broadcast stream containing the marked advertisement (i.e., the advertisement having the plurality of advertisement identification markers inserted therein). The second computing device determines airing parameters of the advertisement based on the advertisement identification markers. The airing parameters of the advertisement are compared with predefined airing specifications corresponding to the advertisement. This comparison may be accomplished by the second computing device or any other suitable computing device.

In another example, the advertisement is made up of frames. In this example, each advertisement identification marker may take the form of a frame as well. For example, each advertisement identification marker may be a replacement frame (containing advertisement identification data) that may be inserted in place of a then existing frame of the advertisement. In another embodiment, each advertisement identification marker may be inserted in addition to any currently existing frames of the advertisement. This advertisement identification data may include data such as: the date of creation for the advertisement, a product or brand name for the product/service being advertised, the name of the company providing the product/service, the duration of the advertisement when shown in full, a version code identifying the particular version of a given advertisement where multiple versions of the advertisement exist, the region that the advertisement was intended to be broadcast in, the channel name and/or channel number that the advertisement is intended to be broadcast on, etc.

Furthermore, the advertisement identification data may include header and/or trailer information used to signify the start and/or end of a particular advertisement identification marker. For example, the beginning of the marker (e.g., the first ten bits of data, where the marker is digitally transmitted) may include a unique marking pattern (e.g., a particular series of ones and zeros in a digital embodiment) that may be used to inform an advertisement marker detection component (e.g., the determinator described herein) where an advertisement identification marker begins. In a similar fashion, the end of each advertisement identification marker may include advertisement identification data (i.e., a trailer) that signifies the end of the advertisement identification marker. The header/trailer may be included in an analog transmission of the advertisement identification marker in a similar fashion. For example, the first and last ten horizontal lines of data may be provided with a unique pattern (e.g., alternating black and white lines) that identify the start and end of the advertisement identification marker.

In another example where the advertisement is made up of frames, the advertisement identification markers may be steganographically inserted into a plurality of the frames making up the advertisement. That is, in this example, advertisement identification data may be inserted into then existing frames of the advertisement by replacing, for example, the least significant bits of data within the frames of a given advertisement with advertisement identification data, such as the advertisement identification data described above. Header and/or trailer information may be used to signify the start and/or end of the steganographic advertisement identification marker in this example as well.

In one example, the airing parameters that are determined include data indicating the duration of the advertisement, the time of day that the advertisement actually aired, and/or a broadcast stream identification (e.g., data indicating the identity of the broadcaster of the stream and/or the specific channel that the stream was broadcast on). In one example, the advertisement identification markers are inserted into the broadcast stream at fixed intervals, but not so frequently as to be detected by human sensory organs (e.g., eyes and/or ears).

In another example, the predefined airing specifications corresponding to the advertisement include data indicating the expected duration of the advertisement (i.e., the duration of the advertisement that was agreed upon by the advertiser and the broadcaster), the expected time of day that the advertisement was scheduled to be aired (as agreed upon by the advertiser and broadcaster), and/or an expected broadcast stream identification (e.g., data indicating the expected identity of the broadcaster of the stream and/or the expected channel that the stream was agreed to broadcast on).

In yet another example, auditing data is generated describing whether or not the advertisement at issue aired in accordance with the predefined airing specifications. The auditing data may include, for example, data indicating a broadcast channel that the at least one advertisement aired on, data indicating a time at which that the at least one advertisement aired, data indicating the determined airing parameters of the at least one advertisement, data indicating a difference between the determined airing parameters of the at least one advertisement and expected airing parameters of the at least one advertisement.

Another technique described by the instant disclosure involves receiving an advertisement containing a plurality of advertisement identification markers. The plurality of advertisement identification markers have been inserted between the start and end of the advertisement prior to reception. The advertisement containing the plurality of advertisement identification markers is inserted into a broadcast stream (e.g., a broadcast stream including programming content). Once the advertisement has been inserted, the broadcast stream with the advertisement is transmitted away for further processing. For example, the broadcast stream containing the advertisement may be transmitted to a computing device for a determination of whether the advertisement aired in accordance with predefined viewing specifications.

Related computing devices and a system for carrying out the aforementioned techniques are also disclosed.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
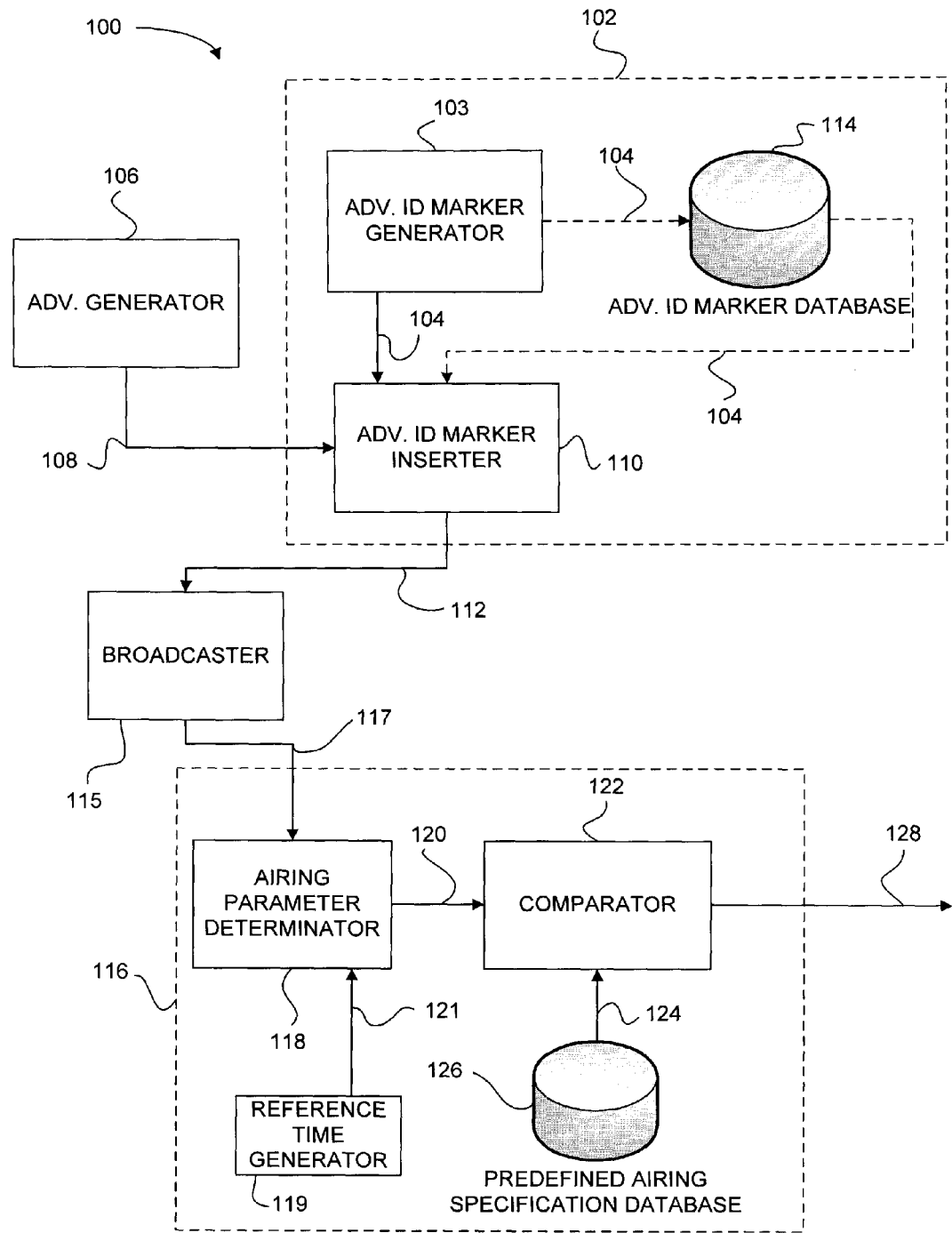
FIG. 1 is a block diagram illustrating one example of a system for determining whether an advertisement aired in accordance with predefined airing specifications.

Referring now to FIG. 1, one example of a system 100, such as a computing system, for determining whether an advertisement aired in accordance with predefined airing specifications is illustrated. In the illustrated example, system 100 includes a first computing device 102, a second computing device 116, and an advertisement generator 106. The first computing device 102 includes an advertisement identification marker generator ("marker generator") 103, an advertisement identification marker inserter ("marker inserter") 110, and an optional advertisement identification marker database ("marker database") 114. The second computing device 116 includes an airing parameter determinator 118 ("determinator"), a comparator 122, a predefined airing specification database 126, and a reference time generator 119.

The marker generator 103, marker inserter 110, airing parameter determinator 118, and comparator 122 may each be implemented as, for example, an electronic circuit, one or more processors and memory that execute one or more software or firmware programs (e.g., shared, dedicated, or grouped processors such as, but not limited to, microprocessors, digital signal processors, or central processing units), combinational logic circuits, application specific integrated circuit(s), and/or other suitable components that provide the described functionality. Alternatively, each discrete component of the system 100 may be distributed across multiple computing platforms (e.g., via networked computing devices such as server computers or the like), wherein each computing platform implements one or more of the illustrated components 103, 110, 118, and 122. Additionally, first computing device 102 and/or second computing device 116 may be implemented as a stand-alone computer programmed to implement the functionality of the components 103, 110, 118, 122 described herein.

The advertisement generator 106 generates one or more advertisements 108. The advertisements may comprise audio content (either analog or digital) and/or video content (either analog or digital). The advertisement generator 106 represents the sum total of all efforts necessary to generate an advertisement 108, such as a television or radio advertisement. This may include, for example, all personnel (e.g., actors, directors, producers, sound/video technicians, writers, etc.) and/or equipment (e.g., audio recorders, image/video cameras, editing equipment, etc.) necessary to generate an audio and/or video advertisement 108. Furthermore, the advertisement generator 106 may be either local or remote to the first computing device 102. The advertisement generator 106 may transmit the generated advertisement(s) 108 to the first computing device 102 over any suitable communication channel (wireless or physical) known in the art. In one example, the advertisement(s) 108 may be stored on a machine-readable medium, such as random access memory (RAM), read-only memory (ROM), electrically erasable programmable read only memory (EEPROM), etc., and provided to the first computing device 102 (e.g., by placing the machine-readable medium in a disk drive of the first computing device 102) for processing.

In one example, the generated advertisement(s) 108 are made up of discrete frames of data. For example, when the advertisement is destined for broadcast on television, it may comprise image frames and/or audio frames. It necessarily follows that, in this example, the broadcast stream that will eventually carry the advertisement may comprise image frame and/or audio frames as well.

The marker generator 103 generates a plurality of advertisement identification markers 104 for insertion into the advertisement(s) 108. The marker generator 103 is operative to generate the advertisement identification markers 104 in a variety of ways. For example, in one embodiment, the marker generator 103 generates each advertisement identification marker 104 as a replacement frame (including advertisement identification data 308) configured for insertion in place of another, then existing, frame of an advertisement 108. This advertisement identification data 308 can include information such as the date of creation for the advertisement, a product or brand name for the product/service being advertised, the name of the company providing the product/service, the duration of the advertisement when shown in full, a version code identifying the particular version of a given advertisement where multiple versions of the advertisement exist, the region that the advertisement was intended to be broadcast in, the channel name and/or channel number that the advertisement is intended to be broadcast on, etc.

Furthermore, the advertisement identification data 308 may include header and trailer information used to signify the start and end of a particular advertisement identification marker 104. For example, the beginning of the marker 104 (e.g., the first 10 bits of data where the marker is digitally transmitted) may include a unique marking pattern (e.g., a particular series of ones and zeros in a digital embodiment) that may be used to inform an advertisement marker detection component (e.g., the determinator 118 described herein) where an advertisement identification marker 104 begins. In a similar fashion, the end of each advertisement identification marker 104 may include advertisement identification data (i.e., a trailer) that signifies the end of the advertisement identification marker. The header/trailer may be included in an analog transmission of the advertisement identification marker 104 in a similar fashion. For example, the first ten and last ten horizontal lines of data may be provided with a unique pattern (e.g., alternating black and white lines) that identify the start and end of the advertisement identification marker 104.

In another embodiment, the marker generator 103 generates each advertisement identification marker as a steganographic advertisement identification marker 408. That is, the marker generator 103 generates advertisement identification data 308, such as the advertisement identification data described above, for steganographic insertion into existing frames of one or more advertisements 108. As known in the art, steganography refers to a technique for concealing information within content (typically digital content) in such a way that no one, apart from the sender and intended recipient, can perceive the information. For example, in the context of the instant disclosure, the marker generator 103 may generate the advertisement identification markers 104 by producing steganographic advertisement identification data configured for insertion into the then existing frames of the advertisement(s) 108. As will be discussed in further detail below with respect to the marker inserter 110, this steganographic advertisement identification data may be inserted into the then existing frames of the advertisement(s) 108 by, for example, replacing the least significant bits of data in a given advertisement frame or frames with the advertisement identification data. Of course, other suitable steganographic insertion techniques known in the art may be employed equally well. Additionally, header/trailer information may be steganographically inserted into the frames of the advertisement as well to signify the start and end of the advertisement identification data 308.

In one optional embodiment, a marker database 114 is operatively connected to the marker generator 103 and marker inserter 110 over suitable communication channels as known in the art, such as a communication bus or network. The marker database 114 is operative to store the generated advertisement identification markers 104 for later insertion into the advertisement(s) 108 via the marker inserter 110. The marker database 114 may be implemented as, for example, any combination of volatile/non-volatile memory components such as read-only memory (ROM), random access memory (RAM), electrically erasable programmable read-only memory (EE-PROM), as a database server computer, etc.

The marker inserter 110 is operatively connected to the advertisement generator 106 and marker generator 103 over suitable communication channels as known in the art. The marker inserter 110 is operative to receive advertisement identification markers 104 from the marker generator 103 and/or, in one embodiment, from the marker database 114. The marker inserter 110 is further operative to receive the advertisements(s) 108 from the advertisement generator 106 in line with any of the transmission techniques discussed above. Upon reception of the advertisement identification markers 104 and the advertisement(s) 108, the marker inserter 110 is operative to insert the advertisement identification markers 104 between the start and end of each advertisement 108. It is also appreciated that, in some embodiments, the marker inserter 110 may insert the advertisement identification markers 104 before and/or after the advertisement(s) 108.

Thus, in one embodiment (illustrated in FIG. 1), the marker inserter 110, under the control of the advertiser (or an agent of the advertiser), inserts the advertisement identification markers 104 into the advertisement(s) 108 before providing the marked advertisement(s) 112 to the broadcaster 115 for broadcast to a television or radio audience, for example. That is, in this embodiment, the advertiser controls the first computing device 102 so as to facilitate insertion of the advertisement identification markers 104 into their advertisement 108 before providing the marked advertisement 112 to the broadcaster 115 for final broadcast to the consuming public. In this manner, the advertiser can avoid any reliance on the broadcaster 115 to insert the markers (since the markers effectively exist as a way to measure the broadcaster's compliance with an advertising agreement).

However, it is contemplated that in another embodiment the broadcaster 115 may provide a broadcast stream containing both programming content (e.g., a television or radio program) and the advertisement(s) 108 to be marked to the first computing device 102. The broadcast stream containing the programming content and advertisement(s) 108 may be provided to the first computing device 102 over any suitable communication channels known in the art. For example, in this embodiment, the broadcaster 115 may transmit a broadcast stream containing both programming content and the advertisement(s) 108 to be marked to the marker inserter 110. In this embodiment, the marker inserter 110 is operative to insert the advertisement identification markers 104 into the advertisement(s) 108 in the broadcast stream using any of the above-described marker insertion techniques. Furthermore, in this embodiment, the marker generator 103 may generate the advertisement identification markers 104 as, for example, a steganographic advertisement identification markers 408 or replacement frames.

In sum, the present disclosure contemplates an embodiment wherein the advertiser inserts advertisement identification markers 104 into their own advertisement(s) 108 and then provides the marked advertisement 112 to a broadcaster 115 for insertion into the broadcaster's programming content stream. The present disclosure contemplates another embodiment wherein the advertiser receives the broadcaster's media stream including both programming content and the advertisement(s) to be marked 108, and inserts advertisement identification markers 104 into their advertisement(s) 108 within the stream.

In one embodiment, the marker inserter 110 is operative to insert the advertisement identification markers 104 at fixed intervals, provided that the intervals are long enough to prevent detection of the advertisement identification markers 104 by human senses. For example, the advertisement identification markers 104 may be inserted into the advertisement(s) of broadcast stream 108 every 100 milliseconds. Of course, other suitable intervals (e.g., every 50 ms, every 150 ms, every 200 ms, etc.) may be selected as desired.

Furthermore, the marker inserter 110 is operative to perform the insertion in a variety of ways. For example, in an embodiment where the marker generator 103 provides advertisement identification markers 104 that are each a replacement frame containing advertising identification data 308, the marker inserter 110 may insert each advertisement identification marker frame in place of a then existing advertising content frame. That is, in this embodiment, the advertisement identification markers 104 replace existing frames of the advertisement. In a different embodiment, the marker inserter 110 may insert each advertisement identification marker frame in addition to the then existing advertising content frames. In either of these embodiments, the determinator 118, as described below, is operative to account for the replacement/additional advertisement identification marker frames in determining the duration of an aired advertisement.

In still another embodiment, the marker inserter 110 may provide steganographic advertisement identification markers 408 by steganographically inserting advertisement identification data 308 into then existing advertisement content frames. In this embodiment, the marker inserter 110 may, for example, replace the least significant bits of data in various advertisement content frames with advertisement identification data 308. Again, the steganographically inserted advertisement identification data 308 will not be perceptible to, for example, a person watching/listening to a broadcast containing the marked advertisement; however, this data is detectable by the airing parameter determinator 118 in accordance with the functionality of the determinator 118, as discussed below.

In any event, the marker inserter 110 outputs the marked advertisement(s) 112 (i.e., the advertisement(s) containing the advertisement identification markers 104) for use by to the broadcaster 115. The broadcaster may be, for example, a local, intermediate, or national broadcaster. For example, the broadcaster could be a local network such as Comcast Sports-Net Chicago™, a national network such as ESPN™, or an intermediate network. In one example, the marked advertisements may be stored on a machine-readable medium such as random access memory (RAM), read-only memory (ROM), electrically erasable programmable read only memory (EE-PROM), etc., and delivered to the broadcaster 115 for insertion into their broadcast stream. Alternatively, the marked advertisements 112 may be transmitted to the broadcaster 115 (or, more specifically, to a computer at the broadcaster's broadcasting facility) over any suitable communication channel known in the art. Regardless of the mode of transmission/delivery, the broadcaster 115 is operative to receive the advertisement(s) containing the plurality of advertisement identification markers 112. Following reception, the broadcaster 115 may insert the advertisement(s) 112 into their broadcast stream using advertisement insertion techniques known in the art. Thereafter, the broadcaster 115 may transmit the broadcast stream containing the marked advertisement(s) 117 to the second computing device 116.

As mentioned above, the second computing device 116 includes an airing parameter determinator 118, a comparator 122, a predefined airing specification database 126, and a reference time generator 119. The second computing device 116 communicates with the broadcaster 115 over any suitable communication channel known in the art. The airing parameter determinator 118 is operative to receive the broadcast stream containing the marked advertisement(s) 117 from broadcaster. In response to receiving the broadcast stream containing the marked advertisement(s) 117, the airing parameter determinator 118 is operative to determine airing parameters of the advertisement(s) in the stream 117 based on the inserted advertisement identification markers 104. To this end, the determinator 118 continuously scans the received broadcast stream for the inserted markers. For example, in the case where the broadcast stream comprises frames and the advertisement identification markers are inserted as replacement frames, the determinator 118 analyzes the data for each frame to see if a given frame comprises either image/audio data or the advertisement identification markers. Techniques for discerning data signals such as the advertisement identification markers from image/audio data are well-known in the art. For example, the identification data in a replacement frame may include a header field at the beginning of what would otherwise be image/audio data indicating that the frame comprises an advertisement identification marker. In the case of steganographic techniques, knowledge of the specific techniques used to insert the markers allows the determinator 118 to analyze the broadcast stream appropriately to detect the markers, e.g., the determinator 118 can inspect the least significant bits of the incoming image/audio data to search for an appropriate identifying header or the like. Those having ordinary skill in the art will appreciate that various techniques for identifying instances of such markers in a received broadcast stream may be employed and that the instant disclosure in not limited in this regard.

As used herein, airing parameters include data indicating a duration of the advertisement(s), data indicating a time of day at which the advertisement(s) aired, and/or broadcast stream identification data.

The determinator 118 is operative to determine the duration of given advertisement by, for example, measuring the time elapsed between detection of a first advertisement identification marker and detection of a last advertisement identification marker (assuming that the first and last advertisement identification markers "book end" the advertisement). In an embodiment where the advertisement identification markers 104 are inserted at fixed intervals throughout a given advertisement, the determinator 118 is operative to determine the duration of given advertisement based on the intervals. For example, if an advertisement were to have one marker at the start of the advertisement, one marker at the end of the advertisement, and three markers between the start and end of the advertisement, and the markers were inserted every 7.5 seconds, the determinator is operative to perform a simple mathematical calculation to determine that the duration of the entire advertisement is 30 seconds. In the embodiment where each advertisement identification marker is a replacement frame, the determinator 118 accounts for whether the advertisement identification marker frames replaced previously existing advertisement content frames (in which case the determined duration of the advertisement need not be adjusted) or were provided in addition to all previously existing advertisement content frames (in which case the duration of the sum of the advertisement identification markers 104 is not considered in arriving at the determined duration of the advertisement).

Furthermore, the determinator 118 is operative to determine the time of day that the advertisement(s) aired. For example, this determination may be achieved via the reference time generator 119. The reference time generator 119 is operatively connected to the determinator 118 and may comprise, for example, a suitable clocking mechanism, as known in the art, capable of outputting reference time data 121 for use by the determinator 118. For example, upon detecting an advertisement identification marker 104 in the broadcast stream containing the marked advertisements 117, the determinator 118 may sample the reference time 121 provided by the reference time generator 119. In this manner, the determinator 118 may ascertain when the advertisement containing the advertisement identification marker 104 actually aired (recognizing that there will be a slight delay between the time that the stream 117 is broadcast and the time it is actually received by the determinator 118).

Another airing parameter capable of determination by the determinator 118 is a broadcast stream identification. As noted above, this data represents the identity of the broadcaster 115 broadcasting the stream 117 and/or the channel that the stream 117 is being broadcast on. For example, the broadcast stream identification data may indicate that the broadcaster is ESPN™. Further, the broadcast stream identification data may indicate that ESPN corresponds to, for example, channel 5 on a given cable provider's channel lineup. The broadcast stream identification data may be encoded in the stream 117 itself using techniques known in the art such that the determinator 118 merely extracts this data as an airing parameter 120.

After the determinator 118 has determined the airing parameters of the advertisement(s), the determined airing parameters 120 may be provided to the comparator 122 for further processing. The comparator 122 is operatively connected to both the determinator 118 and the predefined airing specification database 126 over suitable communication channels known in the art. The predefined airing specification database 126 is operative to store data comprising predefined airing specifications 124 for use by the comparator 122. The predefined airing specification database 126 may be implemented as, for example, any combination of volatile/non-volatile memory components such as read-only memory (ROM), random access memory (RAM), electrically erasable programmable read-only memory (EE-PROM), a database server computer, etc.

The comparator 122 is operative to receive the determined airing parameters 120 and predefined airing specifications 124. The predefined airing specifications 124 correspond to each advertisement (i.e., describe the airing specifications for each of a plurality of advertisements) and comprise, for example, data indicating the expected duration of each advertisement, data indicating the expected time of day that each advertisement was scheduled to be aired by the broadcaster (based on the agreed upon terms between the advertiser and broadcaster), and/or an expected broadcast stream identification. Upon receiving the determined airing parameters 120 and predefined airing specifications 124, the comparator 122 is operative to compare the two using comparison techniques known in the art. If the determined airing parameters 120 match the predefined airing specifications 124, then the comparator 122 determines that the advertisement(s) aired in accordance with the predefined airing specifications 124. However, if the determined airing parameters 120 do not match the predefined airing specifications 124, then the comparator 122 determines that the advertisement(s) did not air in accordance with the predefined airing specifications 124.

In one example, the predefined airing specification database 126 may index the predefined airing specifications 124 based on the advertisement identification data included in the advertisement identification markers 104. In this manner, the comparator 122 may retrieve predefined airing specifications 124 corresponding to the appropriate advertisement (i.e., the advertisement under analysis) based on the advertisement identification data included in the advertisement identification markers 104 of the advertisement under analysis.

Following a comparison, the comparator 122 is operative to generate auditing data 128 describing whether or not the advertisement(s) aired in accordance with the predefined airing specifications 124. This auditing data 128 may be a simple binary indication of whether the predefined airing specifications 124 were satisfied (e.g., "Yes" or "No"), or may include more detailed information regarding the comparison. For example, the auditing data 128 may include data indicating a broadcasting channel that the advertisement(s) aired on, data indicating a time of day at which the advertisement(s) aired, data indicating the determined airing parameters 120 of the advertisement(s), and/or data indicating a difference between the determined airing parameters 120 of the advertisement(s) and the expected airing parameters of the advertisement(s).

The auditing data 128 may be provided to the advertiser in any suitable manner, including but not limited to via an electronic message (e.g., fax, e-mail, text message, voicemail, a posting on a website accessible via the Internet, etc.) or via a tangible medium, such as paper (e.g., a paper-based report indicating the auditing data 128).

Figure 2:
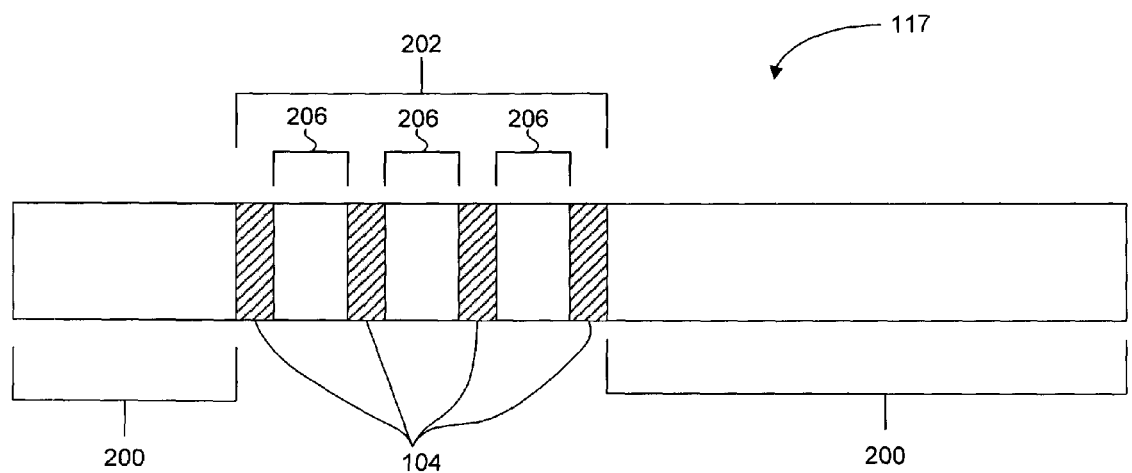
FIG. 2 is a diagram illustrating one example of a broadcast stream including programming content, an advertisement, and advertisement identification markers.

Referring now to FIG. 2, one example of a broadcast stream with marked advertisements 117 is illustrated. The broadcast stream with marked advertisements 117 may be analog or digital in nature, and may represent image and/or audio content. The broadcast stream with marked advertisements 117 includes programming content 200, such as a television or radio show, and an advertisement 202. The broadcast stream with marked advertisements 117 includes advertisement identification markers 104 inserted throughout the advertisement 202. In this example, each advertisement identification marker 104 is shown as being inserted at a fixed interval 206 from the previous and/or subsequent advertisement identification marker 104. Additional programming content 200 is depicted as following the end of the advertisement 202. It is appreciated that in this illustration, each advertisement identification marker 104 could take the form of an entire frame, or could be steganographically inserted into an existing frame or frames of the advertising content in line with the above description of these embodiments.

Figure 3:
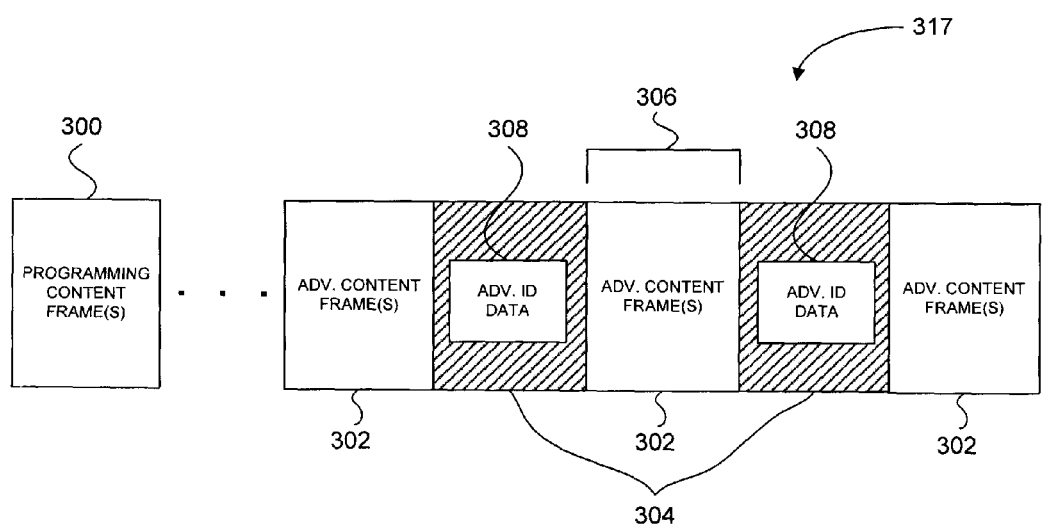
FIG. 3 is a diagram illustrating one example of a broadcast stream comprising frames including programming content, an advertisement, and advertisement identification markers.

FIG. 3 illustrates an embodiment wherein the broadcast stream with marked advertisements 317 comprises frames such as programming content frames 300, advertisement content frames 302, and advertisement identification marker frames 304. That is, in this embodiment, each advertisement identification marker 304 comprises a new frame that has been inserted into the advertisement. As noted above, these advertisement identification marker frames 304 may be inserted into the stream by replacing previously existing advertisement content frames 302 or in addition to any previously existing advertisement content frames 302. Each advertisement identification marker frame 304 includes advertisement identification data 308, such as the advertisement identification data discussed above. The advertisement identification marker frames 304 are illustrated as having been inserted at a fixed interval 306 from one another.

Figure 4:
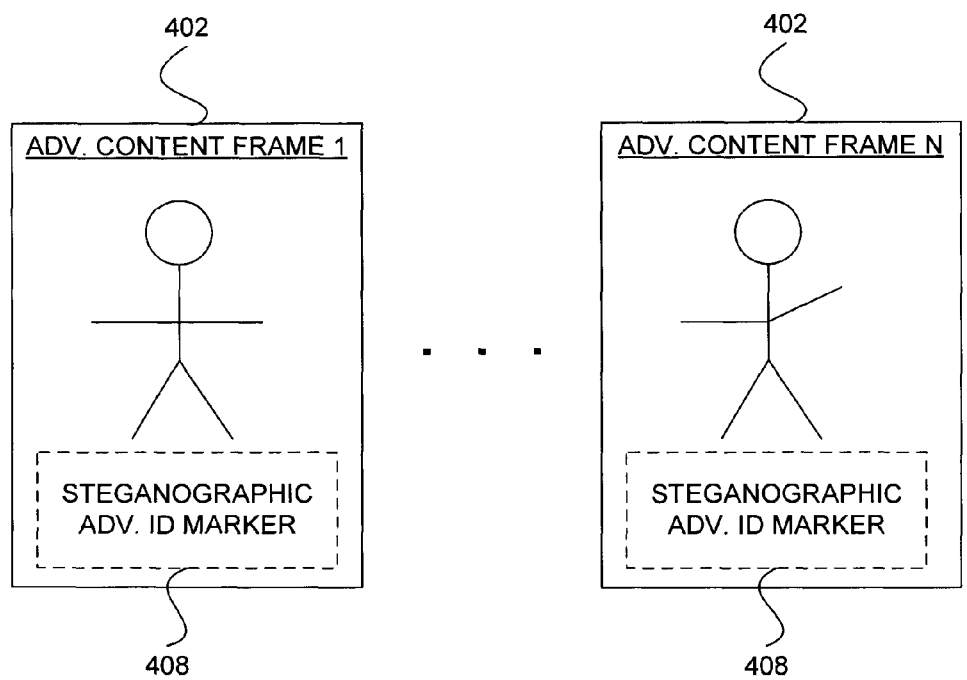
FIG. 4 is a block diagram illustrating one example of steganographic advertising identification markers that have been inserted into advertising content frames.

FIG. 4 is a block diagram illustrating one example of advertising content frames 402 (which there may be any number of from 1 to N) containing steganographic advertisement identification markers 408. The markers 408 include advertisement identification data, such as the advertisement identification data discussed above, and have been inserted into the advertising content frames in line with the steganographic insertion techniques disclosed with respect to the marker inserter 110. That is, the steganographic advertisement identification markers 408 shown may comprise advertisement identification data that replaces the least significant bits of data of the original advertising content frames 402. In this manner, the steganographic advertisement identification markers 408 are not perceptible by human eyes or ears, but are detectable by an appropriate detection component, such as the airing parameter determinator 118.

Figure 5:
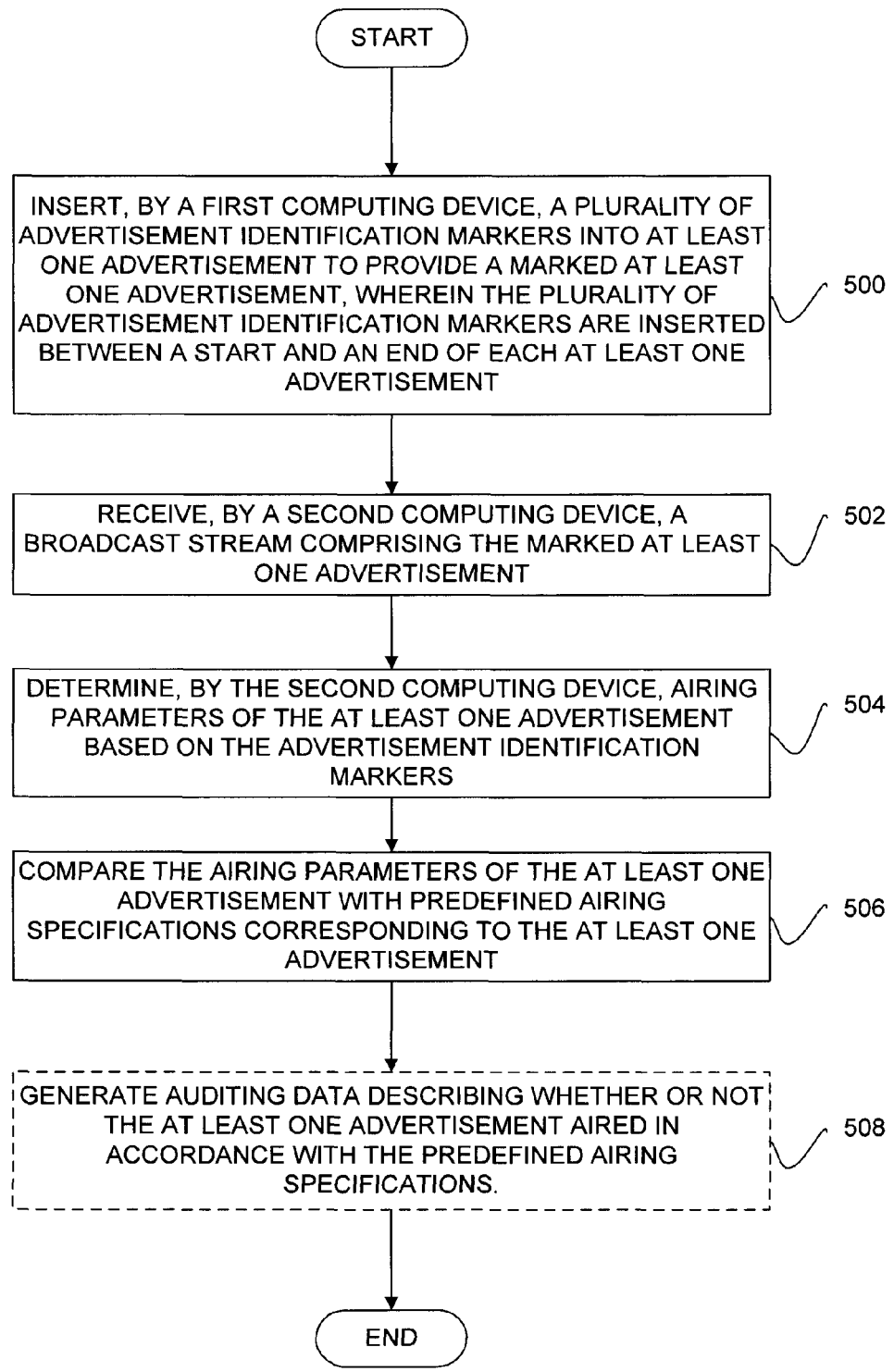
FIG. 5 is a flowchart illustrating one example of a method for determining whether an advertisement aired in accordance with predefined airing specifications.

FIG. 5 is a flowchart illustrating one example of a method for determining whether an advertisement aired in accordance with predefined airing specifications. This method may be carried out, for example, by the computing devices 102, 116 of system 100 in line with their above described functionality. At step 500, a plurality of advertisement identification markers are inserted into at least one advertisement, by a first computing device, to provide a marked at least one advertisement. The plurality of advertisement identification markers are inserted between a start and an end of the at least one advertisement. At step 502, a second computing device receives a broadcast stream comprising the marked at least one advertisement. At step 504, airing parameters of the at least one advertisement are determined by the second computing device based on the advertisement identification markers. At step 506, the airing parameters of the at least one advertisement are compared with predefined airing specifications corresponding to the at least one advertisement. At optional step 508, auditing data is generated that describes whether or not the at least one advertisement aired in accordance with the predefined airing specifications.

The present disclosure provides techniques for determining whether an advertisement aired in accordance with predefined airing specifications. Previously, it was difficult, time-consuming, and costly to accurately determine whether an advertisement aired in accordance with the agreed upon terms between the advertiser and broadcaster. In contrast, the present disclosure provides a simple, quick, and cost-efficient technique for making such a determination.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method comprising:
receiving, by a computing device, at least one advertisement;
inserting, by the computing device, a plurality of advertisement identification markers into the at least one advertisement to create a marked at least one advertisement,
the plurality of advertisement identification markers being inserted at predetermined locations in the at least one advertisement,
a first marker of the plurality of advertisement identification markers including information associated with a desired region for broadcasting the at least one advertisement, and
a second marker of the plurality of advertisement identification markers including information associated with desired channel information for broadcasting the at least one advertisement; and
sending, by the computing device, the marked at least one advertisement for insertion into a broadcast stream,
the marked at least one advertisement being compared to airing parameters of the at least one advertisement using one or more predefined airing specifications, to determine whether the marked at least one advertisement aired in accordance with the one or more predefined airing specifications,
the airing parameters being determined based on the plurality of advertisement identification markers and the predetermined locations of the plurality of advertisement identification markers, and
the airing parameters including a duration of the at least one advertisement.

2. The method of claim 1, where
the at least one advertisement includes a plurality of frames, and
each advertisement identification marker of the plurality of advertisement identification markers is associated with a frame including advertisement identification data.

3. The method of claim 1, where the airing parameters further include:
information associated with a time at which the at least one advertisement aired.

4. The method of claim 1, where, when inserting the plurality of advertisement identification markers into the at least one advertisement, the method includes:
inserting the plurality of advertisement identification markers at fixed intervals.

5. The method of claim 1, where
the at least one advertisement includes a plurality of frames, and
when inserting the plurality of advertisement identification markers into the at least one advertisement, the method includes:
steganographically inserting advertisement identification data into at least two of the plurality of frames.

6. The method of claim 1, where the one or more predefined airing specifications are associated with at least one of:
an expected duration of the at least one advertisement,
an expected time at which the at least one advertisement was to be aired, or
an expected broadcast stream identification.

7. The method of claim 1, where auditing data, associated with whether the at least one advertisement aired in accordance with the one or more predefined airing specifications, is generated.

8. The method of claim 2, where
the advertisement identification data includes data associated with at least one of:
a date of creation of the at least one advertisement,
a product or a brand name for a product or a service associated with the at least one advertisement,
a name of a company providing the product or the service,
a version code identifying a particular version of the at least one advertisement,
header information associated with the at least one advertisement, or
trailer information associated with the at least one advertisement.

9. The method of claim 7, where the auditing data includes at least one of:
data indicating a broadcast channel that the at least one advertisement aired on;
data indicating a time at which that the at least one advertisement aired;
data indicating the airing parameters of the at least one advertisement; or
data indicating a difference between the airing parameters of the at least one advertisement and the one or more predefined airing specifications corresponding to the at least one advertisement.

10. A system comprising:
a first computing device to:
insert a plurality of advertisement identification markers into at least one advertisement to create a marked at least one advertisement,
the plurality of advertisement identification markers being inserted at predetermined locations in the at least one advertisement,
a first marker of the plurality of advertisement identification markers including information associated with a desired region for broadcasting the at least one advertisement, and
a second marker of the plurality of advertisement identification markers including information associated with desired channel information for broadcasting the at least one advertisement; and
send the marked at least one advertisement for insertion into a broadcast stream; and
a second computing device to:
receive the broadcast stream including the marked at least one advertisement;
determine airing parameters of the marked at least one advertisement based on the plurality of advertisement identification markers and the predetermined locations of the plurality of advertisement identification markers,
the airing parameters including a duration of the at least one advertisement;
compare the determined airing parameters of the marked at least one advertisement with predefined airing specifications; and
determine, based on comparing the determined airing parameters of the marked at least one advertisement with the predefined airing specifications, whether the marked at least one advertisement aired in accordance with the predefined airing specifications.

11. The system of claim 10, where
the at least one advertisement includes a plurality of frames, and
each advertisement identification marker of the plurality of advertisement identification markers is associated with a frame including advertisement identification data.

12. The system of claim 11, where
the advertisement identification data includes data associated with at least one of:
a date of creation of the at least one advertisement,
a product or a brand name for a product or a service associated with the at least one advertisement,
a name of a company providing the product or the service,
a version code identifying a particular version of the at least one advertisement,
header information associated with the at least one advertisement, or
trailer information associated with the at least one advertisement.

13. The system of claim 10, where the airing parameters further include:
information associated with a time at which the at least one advertisement aired.

14. The system of claim 10, where the first computing device, when inserting the plurality of advertisement identification markers into the at least one advertisement, is further to:
insert the plurality of advertisement identification markers at fixed intervals.

15. The system of claim 10, where
the at least one advertisement includes a plurality of frames, and
the first computing device, when inserting the plurality of advertisement identification markers into the at least one advertisement, is further to:
steganographically insert advertisement identification data into at least two of the plurality of frames.

16. The system of claim 10, where the one or more predefined airing specifications are associated with least one of:
an expected duration of the at least one advertisement,
an expected time at which the at least one advertisement was to be aired, or
an expected broadcast stream identification.

17. The system of claim 10, where the second computing device is further to:
generate auditing data, associated with whether the at least one advertisement aired in accordance with the predefined airing specifications based on the comparison of the airing parameters with the predefined airing specifications.

18. The system of claim 10, where
the at least one advertisement includes a plurality of frames, and
the first computing device is further to:
generate each advertisement identification marker, of the plurality of advertisement identification markers,
the first computing device, when generating each advertisement identification marker, being to:
generate steganographic advertisement identification data for insertion into the plurality of frames; and
generate replacement frames including advertisement identification data for insertion in place of existing frames of the plurality of frames.

19. The system of claim 17, where the auditing data includes at least one of:
data indicating a broadcast channel that the at least one advertisement aired on;
data indicating a time at which that the at least one advertisement aired;
data indicating the airing parameters of the at least one advertisement; or
data indicating a difference between the airing parameters of the at least one advertisement and the predefined airing specifications corresponding to the at least one advertisement.

20. A computing device comprising:
a memory to store instructions; and
a processor to execute the instructions to:
generate a plurality of advertisement identification markers for insertion into at least one advertisement;
insert the plurality of advertisement identification markers into the at least one advertisement to create a marked at least one advertisement,
the plurality of advertisement identification markers being inserted at predetermined locations in the at least one advertisement,
a first marker of the plurality of advertisement identification markers including information associated with a desired region for broadcasting the at least one advertisement, and
a second marker of the plurality of advertisement identification markers including information associated with desired channel information for broadcasting the at least one advertisement; and
send the marked at least one advertisement for insertion into a broadcast stream,
the marked at least one advertisement being compared to airing parameters of the at least one advertisement using one or more predefined airing specifications, to determine whether the marked at least one advertisement aired in accordance with the airing parameters,
the airing parameters being determined based on the plurality of advertisement identification markers and the predetermined locations of the plurality of advertisement identification markers, and
the airing parameters including a duration of the at least one advertisement.

21. The computing device of claim 20, where
the at least one advertisement includes a plurality of frames, and
each advertisement identification marker of the plurality of advertisement identification markers is associated with a frame including advertisement identification data.

22. The computing device of claim 20, where the processor is further to:
insert the plurality of advertisement identification markers at fixed intervals throughout the at least one advertisement.

23. The computing device of claim 20, where
the at least one advertisement includes a plurality of frames, and
the processor, when inserting the plurality of advertisement identification markers, is further to:
steganographically insert advertisement identification data into at least two of the plurality of frames.

24. The computing device of claim 20, where
the at least one advertisement includes a plurality of frames, and the processor, when generating the plurality of advertisement identification markers, is further to at least one of:
generate steganographic advertisement identification data for insertion into the plurality of frames; or
generate replacement frames including advertisement identification data for insertion in place of existing frames of the plurality of frames.

25. The computing device of claim 21, where
the advertisement identification data includes data associated with at least one of:
a date of creation of the at least one advertisement,
a product or a brand name for a product or a service associated with the at least one advertisement,
a name of a company providing the product or the service,
a version code identifying a particular version of the at least one advertisement,
header information associated with the at least one advertisement, or
trailer information associated with the at least one advertisement.

26. A computing device comprising:
a memory to store instructions; and
a processor to execute the instructions to:
receive a broadcast stream including at least one advertisement,
the at least one advertisement having a plurality of advertisement identification markers inserted at predetermined locations in the at least one advertisement,
the plurality of advertisement identification markers being inserted at predetermined locations in the at least one advertisement,
a first marker of the plurality of advertisement identification markers including information associated with a desired region for broadcasting the at least one advertisement, and
a second marker of the plurality of advertisement identification markers including information associated with desired channel information for broadcasting the at least one advertisement;
determine airing parameters of the at least one advertisement based on the plurality of advertisement identification markers and the predetermined locations of the plurality of advertisement identification markers, the airing parameters including a duration of the at least one advertisement;
compare the determined airing parameters of the at least one advertisement with predefined airing specifications; and
determine, based on comparing the determined airing parameters of the at least one advertisement with the predefined airing specifications, whether the at least one advertisement aired in accordance with the predefined airing specifications.

27. The computing device of claim 26, where the predefined airing specifications are associated with the at least one advertisement.

28. The computing device of claim 26, where
the at least one advertisement includes a plurality of frames, and
each advertisement identification marker of the plurality of advertisement identification markers is associated with a frame including advertisement identification data.

29. The computing device of claim 26, where the airing parameters further include:
information associated with a time at which the at least one advertisement aired.

30. The computing device of claim 27, where the predefined airing specifications are associated with at least one of:
an expected duration of the at least one advertisement,
an expected time at which the at least one advertisement was to be aired, or
an expected broadcast stream identification.

31. The computing device of claim 27, where the processor is further to:
generate auditing data associated with whether the at least one advertisement aired in accordance with the predefined airing specifications based on the comparison of the airing parameters with the predefined airing specifications.

32. The computing device of claim 31, where the auditing data comprises at least one of:
data indicating a broadcast channel that the at least one advertisement aired on;
data indicating a time at which that the at least one advertisement aired;
data indicating the airing parameters of the at least one advertisement; or
data indicating a difference between the airing parameters of the at least one advertisement and the predefined airing specifications corresponding to the at least one advertisement.

33. The computing device of claim 28, where
the advertisement identification data includes data associated with at least one of:
a date of creation of the at least one advertisement,
a product or a brand name for a product or a service associated with the at least one advertisement,
a name of a company providing the product or the service,
a version code identifying a particular version of the at least one advertisement,
header information associated with the at least one advertisement, or
trailer information associated with the at least one advertisement.

34. A method comprising:
receiving, by a computing device, a plurality of advertisement identification markers inserted into at least one advertisement,
the plurality of advertisement identification markers being inserted at predetermined locations in the at least one advertisement,
a first marker of the plurality of advertisement identification markers including information associated with a desired region for broadcasting the at least one advertisement, and
a second marker of the plurality of advertisement identification markers including information associated with desired channel information for broadcasting the at least one advertisement;
determining, by the computing device, airing parameters of the at least one advertisement based on the plurality of advertisement identification markers and the predetermined locations of the plurality of advertisement identification markers,
the airing parameters including a duration of the at least one advertisement;

comparing, by the computing device, the determined airing parameters of the at least one advertisement with predefined airing specifications; and determining, by the computing device and based on comparing the determined airing parameters of the at least one advertisement with the predefined airing specifications, whether the at least one advertisement aired in accordance with the predefined airing specifications.

\* \* \* \* \*